Aug. 31, 1943.  F. VON OPEL  2,328,517
MOVABLE POSITION FINDING DEVICES,
PARTICULARLY COURSE PROTRACTORS
Filed Jan. 17, 1942    2 Sheets-Sheet 1
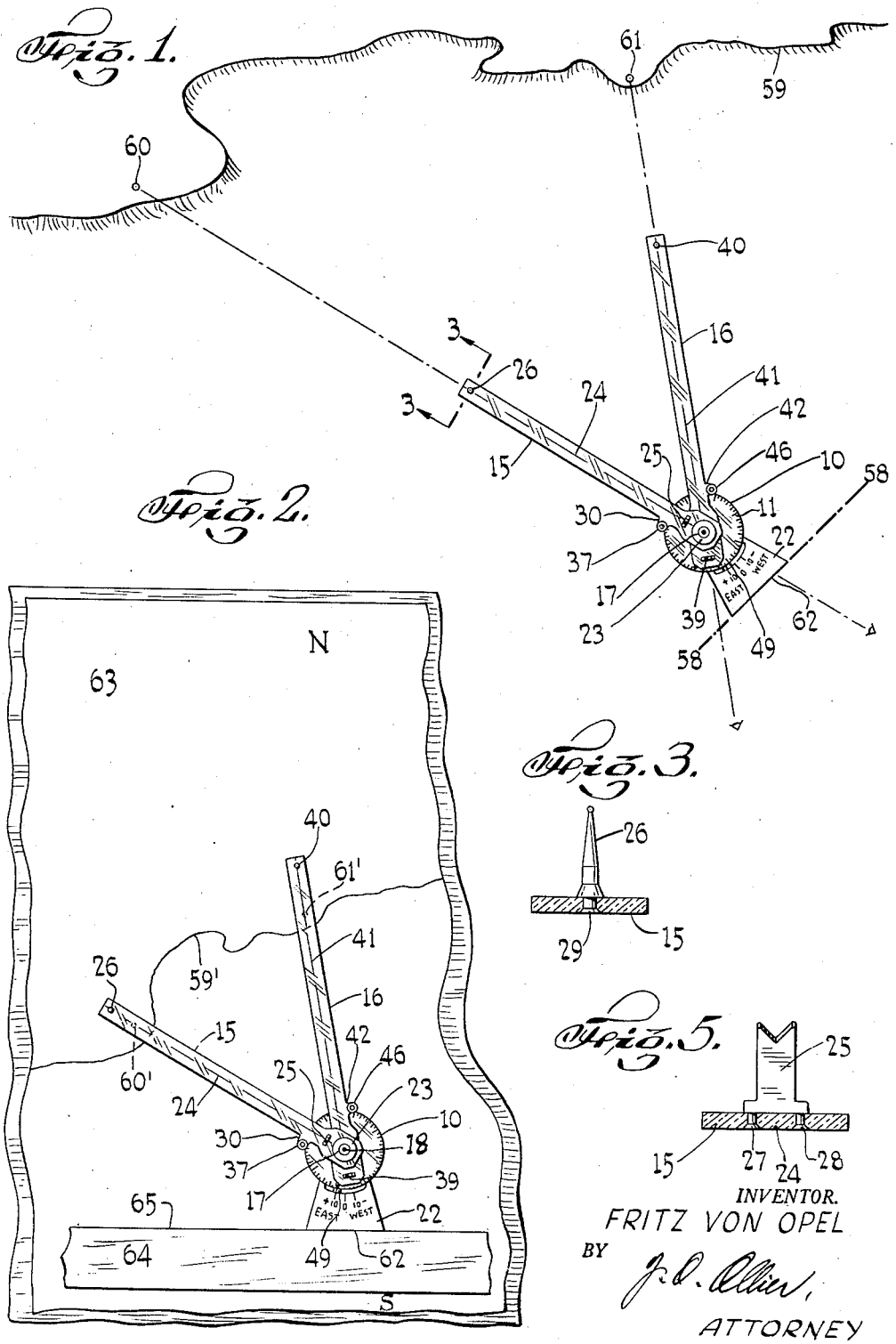
INVENTOR.
FRITZ VON OPEL
BY
ATTORNEY Aug. 31, 1943.   F. VON OPEL   2,328,517
MOVABLE POSITION FINDING DEVICES,
PARTICULARLY COURSE PROTRACTORS
Filed Jan. 17, 1942   2 Sheets-Sheet 2
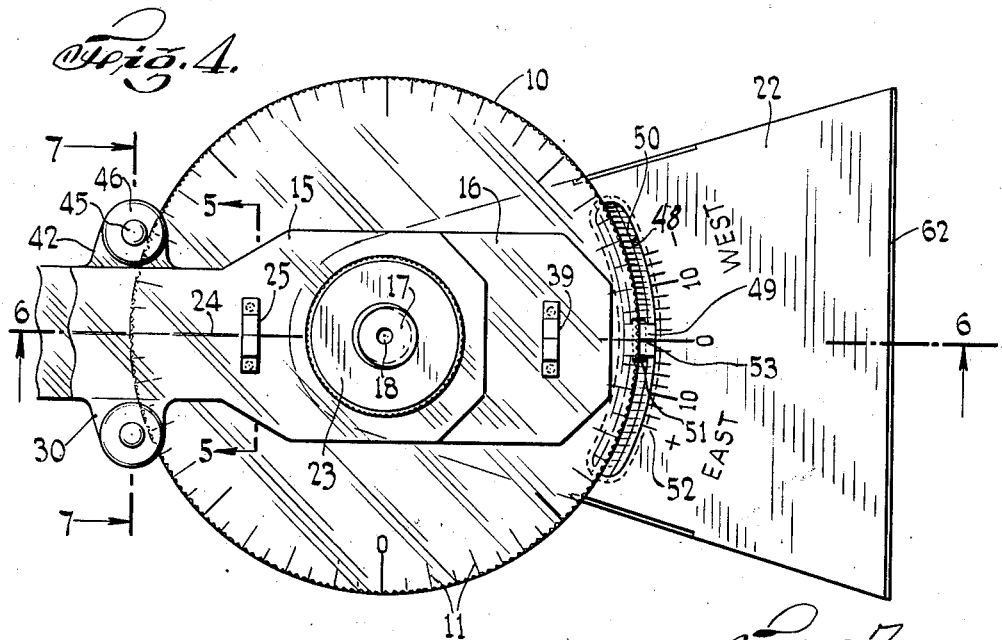
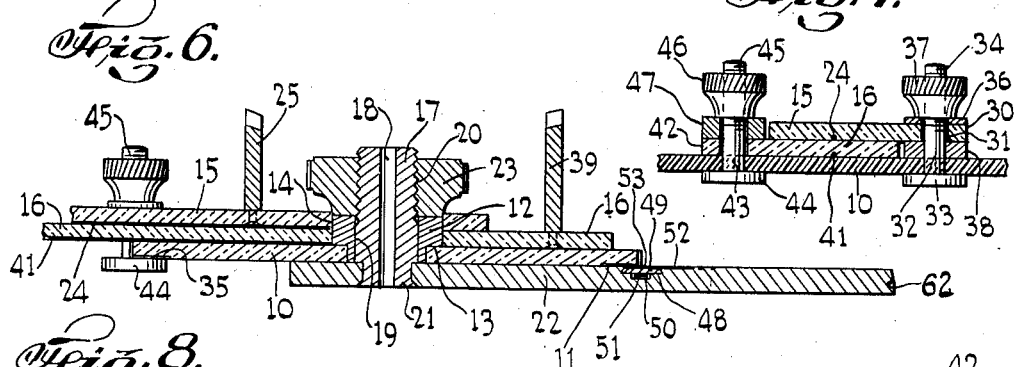
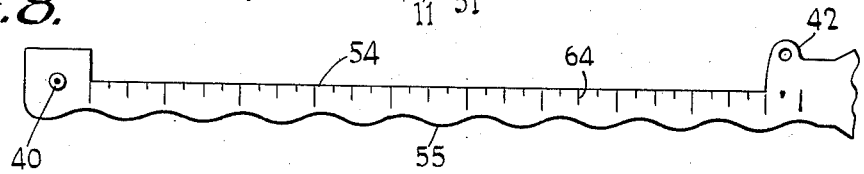
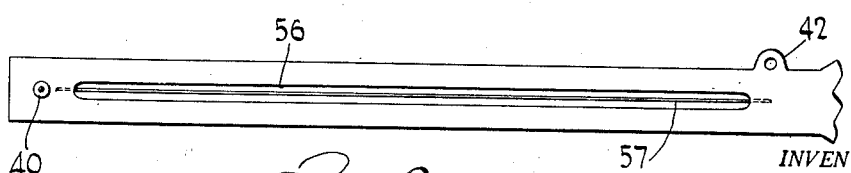
INVENTOR.
FRITZ VON OPEL
ATTORNEY Patented Aug. 31, 1943

2,328,517

UNITED STATES PATENT OFFICE 2,328,517

MOVABLE POSITION FINDING DEVICES, PARTICULARLY COURSE PROTRACTORS

Fritz von Opel, New York, N. Y.; vested in the Alien Property Custodian

Application January 17, 1942, Serial No. 427,088

5 Claims. (Cl. 33—67)

This invention relates to movable position finding devices, particularly course protractors for navigation purposes on water or in the air.

It is an object of the invention to facilitate the use of position finding devices of this type.

It is another object of the invention to enable quick taking of bearings on two or three known fixed points and to fix the arms of the device firmly in their adjusted position relative to the protractor or compass card.

It is a further object of the invention to render taking of bearings more accurate.

It is still a further object of the invention to facilitate the finding of the position of a vessel or vehicle on the chart.

It is a further object of the invention to render finding of the position of a vessel or vehicle on the chart more accurately.

It is still another object of the invention to provide a navigation device comprising a protractor disk or compass card and arms of stiff transparent material, to arrange for immobilization of the arms relative to the protractor disk after bearings have been taken, and to have the protractor with arms also temporarily immobilized relative to a base which facilitates both the taking of bearings and finding the position on a chart.

It is still another object of the invention to permit taking of bearings with due consideration of the magnetic variation or deviation of the compass, by combining with the protractor disk and its arms a base plate which can be temporarily immobilized relative to the former in adjusted position, and to provide the base plate with a marked member to adjust the compass variation thereon.

It is still a further object of the invention to provide a base with a member permitting adjustment of the compass variation or deviation, to adjust the base relative to a protractor corresponding to the angle between the lubber line of the vessel or vehicle and the indication of the compass, to temporarily fix the base and protractor in their so adjusted relative position, to permit taking of two or three bearings by means of arms combined with the so fixedly adjusted protractor and base, and to fix the arms in their relative position to the base and protractor after having taken bearings, so that an almost rigidly adjusted device can be used for finding the position of the vessel or vehicle on a chart.

It is a further object of the invention to permit measuring of the distances between the position of the vessel or vehicle and known fixed points by means of the same temporarily fixedly adjusted device with which bearings have just been taken.

These and other objects will be more clearly understood when the specification proceeds with reference to the drawings in which Fig. 1 shows in a schematic plan view the use and adjustment of the protractor in taking bearings on two fixed points relative to the lubber line of the vessel, Fig. 2 the use of the adjusted protractor on a chart to determine the position of the vessel, Fig. 3 a cross section through the front end of a movable arm of the protractor along line 3—3 in Fig. 1, Fig. 4 a plan view of a part of the protractor with attached arms, Fig. 5 a cross section through an arm along line 5—5 in Fig. 4, Fig. 6 a cross section along line 6—6 in Fig. 4 through the protractor, its base plate and two arms rotatably attached thereto, Fig. 7 a cross section along line 7—7 in Fig. 4 through the arms, their clamping devices and the protractor, Figs. 8 and 9 in plan view other shapes of arms respectively.

In its preferred feature as exemplified in the drawings the device according to the invention comprises a disk-like, preferably transparent protractor or compass card 10, provided with the usual graduation or compass points 11 near its periphery. In a bore (Fig. 6) of the protractor disk 10, a bushing 12 is arranged, the shoulder 13 of which rests on the disk and is provided with a cylindrical circumferential surface 14 on which two arms 15, 16 are rotatably mounted. A bolt 17 provided with a screw-thread 20 at its upper end and a center hole 18 has its cylindrical portion 19 passing through the bushing 12, and its lower end 21 is riveted into the base plate 22. A nut 23 engages the screw-threaded portion 20 and, when screwed down in the position shown in Fig. 6, presses base plate 22 into frictional engagement with disk 10 and thereby fixes their relative positions.

Arm 15 is of transparent, preferably plastic material, such as known under the trade name "Lucite," the same as used for disk 10 and the other rotatable arm 16. A thin and grooved opaque center hair-line 24 is made preferably on the lower side of arm 15. On the upper side of arm 15 registering with center line 24 and near bolt 17, a sight vane 25 is fastened, and in line with it at the outer end of arm 15 another sight vane 26, preferably by means of rivets 27, 28 and 29, respectively, as to be seen more in detail from Figs. 3 and 5. A lug 30 is formed on one side of arm 15, through the hole 31 of which a bolt 32 is passed, provided with a head 33 and a screw threaded free end 34. Head 33 engages disk 10 from below, preferably within a circumferential recess 35, as to be seen more in detail from Figs. 6 and 7. A washer 36 may be threaded, if desired, over bolt 32 and a nut 37 is screwed on it. Another washer 38, Fig. 7, serves to space arm 15 from disk 10, and its height slightly exceeds that of arm 16. It will be appreciated that by tightening nut 37 on bolt 34, arm 15 can be fixed by friction in a desired position relative to disk 10 without interfering with the free movement of the other arm 16 relative to that disk and arm 15.

In a similar manner, arm 16 is provided with a sight vane 39 near its joint with disk 10, and another sight vane 40 near its front end; an opaque, thin and grooved center hairline 41 on its lower side; a lug 42 and a bolt 43 passed therethrough and provided with a head 44 on its lower end and a screw threaded upper end 45 onto which a nut 46 can be screwed. 47 is a washer. It will be appreciated that by tightening nut 46 on the screw threaded end 45 of bolt 43, head 44 is pressed into frictional engagement with recess 35 of disk 10, and thereby arm 16 fixed relative to disk 10 without interfering with the motion of the other arm 15.

Base plate 22 is provided with a curved, dovetailed recess 48 coaxial with bolt 17 and another narrower recess 50 below recess 48. In recess 48 a dove-tailed member or runner 49 is movably arranged, and there is arranged in recess 50, a spring 51 which holds piece 49 in any position into which it is moved. A graduation 52 is provided on plate 22 on one side of recess 48, and a grooved center mark 53 on runner 49.

In using the device particularly to take cross bearings, first the magnetic variation of the compass is adjusted on the base plate 22 by moving the runner 49 in recess 48 to the left or right relative to the zero mark of the base plate 22 at an angle equalling that of the magnetic variation. Thus, if the magnetic variation be for instance 10 degrees East, runner 49 will be moved so that its zero mark 53 coincides with the line marked 10° on the base plate 22. Thereupon the angle between the lubber line of the vessel and the N—S line of the compass is taken and the protractor or compass card 10 turned clockwise relative to the base plate 22 until the point of the graduation 11 on the protractor disk 10 corresponding to the compass angle coincides with the zero mark 53 on the previously adjusted runner 49. In other words, the angle corresponding to the magnetic variation of the compass is added to or subtracted from the angle between the lubber line and the N—S line of and read from the compass. Protractor 10 is now fixed in its position relative to base 22 by tightening nut 23 on bolt 17 and thereby pressing shoulder 13 of bushing 12 against the protractor 10. There is a slight clearance between the lowermost ring surface of bushing 12 and base 22 so as to permit shoulder 13 to frictionally engage protractor 10 under sufficient pressure. There is also a slight clearance between surface 14 and the holes in arms 15, 16 so as to permit swinging of the latter around bushing 12.

Referring to Fig. 1 it is assumed that piece 49 has been adjusted so that its zero mark coincides with 10° East on base 22, and furthermore that the protractor 10 has been rotated clockwise and fixed so that the mark on it corresponding to a measured angle of, e. g., 45° between the lubber line 58—58 and the N—S line of the compass coincides with the zero mark on the adjusted runner 49. Now edge 62 of base 22 is held against a wall or other stationary part of the vessel which is parallel to or within its lubber line, and a first bearing on a known, fixed point 60 on shore 59 is taken through sights 25, 26 of arm 15, by swinging arm 15 around bushing 12; arm 15 is thereupon fixed in its position relative to protractor 10 by tightening nut 37 on bolt 34 and thereby pressing head 33 into recess 35 on protractor 10.

Immediately thereafter another bearing is taken through the sights 39, 40 on another known, fixed point 61, by swinging arm 16 around bushing 12; thereupon arm 16 is fixed in its position relative to protractor 10 by tightening nut 46 on bolt 45 and thereby pressing head 44 into recess 35 on protractor 10.

Thereby taking of the bearings is completed.

Now nut 23 is loosened and base 22 rotated clockwise relative to protractor 10 and arms 15, 16 in their temporarily fixed position relative to the protractor, so that the zero mark of runner 49 (which remains in unchanged position relative to base 22) coincides with the zero mark on protractor 10; thereupon nut 23 is tightened again.

The thus readjusted device is now positioned on a chart 63, Fig. 2, on which a parallel ruler 64 is arranged movable parallel to the W—E direction of the chart. Edge 62 of base 22 is held against edge 65 of parallel ruler 64 and the latter moved parallel to itself and, if necessary, base 22 in contact with edge 65 shifted to the right or left, until points 60', 61' which correspond on the chart to the fixed points 60, 61, respectively, on which bearings were taken, cut center line 24 and 41, respectively, of the arms 15 and 16: Then the center of hole 18 indicates on the chart the position of the vessel, and this point can be marked e. g., by means of a pin struck through hole 18.

Instead of a parallel ruler 64 movable parallel to the W—E line, a parallel ruler movable parallel to the N—S line of the chart can be used, and in such event the base 22 is to be swung counterclockwise relative to protractor 10 so that the zero mark on runner 49 coincides with a mark of graduation 11 on protractor disk 10 corresponding to 90° less the angle between the lubber line and the N—S line of the compass.

It will be appreciated from the above that the device according to the invention permits the taking of cross bearings on fixed points relative to the lubber line quickly and accurately, due to the fact that base 22 is rigidly connected with protractor 10, while the bearings are taken, and its edge 62 permits to hold the device firmly against a stationary part of the vessel. Furthermore, after the bearings are taken, the arms are fixed in their position and so is base 22 after its readjustment, so that no changes in the relative position of the elements of the device can occur during its subsequent application to find the position of the vessel on the chart. This latter manipulation is therefore equally simple and easy, quick and accurate.

In Fig. 8, another feature of an arm such as 16 is shown; in this exemplification the arm is provided with an edge 54 coinciding with its center line, while the outer edge 55 is wavy in order to prevent misuse. The arm is also provided with sight vanes (one of which is shown at 40) and a lug 42 near the (not shown) joint with base plate 22. A graduation 64 along edge 54 permits the reading of distances, on the scale of the chart, between a known fixed point (on which the bearing was taken) and the position of the vessel just found on the chart. It is understood that similar graduations can be applied on arms of other shape, such as shown in the other exemplifications of the invention. It is also to be understood that an additional arm can be mounted on bolt 17, e. g., for taking bearings on three points and measuring distances from them. The arm exemplified in Fig. 9 differs from that in Fig. 8 by being provided with a longitudinal slit 56 in which a wire, thread or the like is stretched coinciding with the center line of the arm.

It will be understood that by making the arms of transparent and relatively rigid material, taking of bearings and subsequent finding of the position of the vessel on the chart is facilitated. The protractor disk need not be transparent but its transparency assists in finding the position of the vessel on the chart, particularly if known fixed points on the chart are close to the position of the vessel and therefore within the area of the protractor disk. On the other hand, if the arms are made according to the exemplifications shown in Figs. 8 and 9, they need not be made of transparent material.

The same way, the base plate may be made, e. g., of transparent, preferably plastic material, or of metal or opaque pressed material, or the like.

It is further understood that the invention is not limited to any particular material or feature as herein described by way of exemplification, and not limited to the particular applications or uses herein exemplified; it may equally well be used for finding positions, distances, etc., of vehicles moving on land or in the air, and in finding distances and angles of an aim relative to a gun and the observer's position which is at a known distance from the gun. Furthermore, the clamping devices for individually immobilizing the arms in their adjusted position relative to the protractor disk proves of great advantage in handling the device and also renders it independent from wear in the joints between the arms and the protractor disk; however, such clamping devices may be omitted if sufficiently tight and permanent friction in the joints is secured, to retain the arms in their adjusted position without requiring excessive force in swinging them around the joints, and therefore the invention is to be derived in its broadest aspect from the appended claims.

What I claim is:

1. A movable device for finding positions, particularly a course protractor device for navigation purposes, substantially comprising, in combination, a protractor disk provided with a center hole, a bushing provided with a center bore and an outer cylindrical portion of larger diameter and another outer cylindrical portion of smaller diameter, said portions connected by a shoulder and the one of smaller diameter arranged in said hole of the disk, a number of arms, two as a minimum, arranged rotatably around said portion of larger diameter on one side of said disk, a visible center line directed towards the center of said disk on each of said arms, a hole outside but close to the circumference of the disk in each of said arms, a bolt having a head on one end and being screw-threaded on its free end arranged in said hole of each arm and projecting beyond both sides of the latter and said disk so that said head is arranged on the side of said disk opposite to that over which said arms are arranged, a nut on said screw-threaded end, so that upon tightening said nut, said head frictionally engages said disk and thereby immobilizes the arm relative to the disk, a base plate on the side of said disk opposite to that on which said arms are arranged, a bolt exemplified by a hollow cylinder rotatably arranged in the bore of said bushing and projecting beyond both sides of the latter, said bolt fixedly connected with said base plate and screw-threaded on its free end, a nut on said free end, so that upon tightening said latter nut the shoulder of said bushing is pressed into frictional engagement with said disk and thereby immobilizes it relative to said base plate, a zero mark on said base plate close to the graduation on said disk, and an edge of said base plate outside the area of the disk arranged to be held against an object in predetermined position.

2. A movable device for finding positions, particularly a course protractor device for navigation purposes, substantially comprising, in combination, a protractor disk provided with a center hole, a bushing provided with a center bore and an outer cylindrical portion of larger diameter and another outer cylindrical portion of smaller diameter, said portions connected by a shoulder and the one of smaller diameter arranged in said hole of the disk, a number of arms, two as a minimum, arranged rotatably around said portion of larger diameter on one side of said disk, a visible center line directed towards the center of said disk on each of said arms, a base plate on the side of said disk opposite to that on which said arms are arranged, a bolt exemplified by a hollow cylinder rotatably arranged in the bore of said bushing and projecting beyond both sides of the latter, said bolt fixedly connected with said base plate and screw-threaded on its free end, a nut on said free end, so that upon tightening said nut the shoulder of said bushing is pressed into frictional engagement with said disk and thereby immobilizes it relative to said base plate, a zero mark on said base plate close to the graduation on said disk, and an edge of said base plate outside the area of the disk arranged to be held against an object in predetermined position.

3. In a movable device for finding positions, particularly a course protractor device for navigation purposes, substantially comprised of a protractor disc, a number of arms, two as a minimum, rotatably connected with the center of said disc, a visible center line directed toward the center of said disc and sight vanes registering with said center line on each of said arms, a base plate rotatably connected with said disc and an edge of said base plate outside the area of said disc arranged to be held against an object in predetermined position: the novel arrangement of a movably mounted member having a zero mark operatively associated wth said base plate, said member movable in predetermined path outside but close to the circumference of said disc, a graduation on said base plate including a zero mark close to said path, and adjustable means for individually and temporarily immobilizing said base plate and each of said arms, respectively, relative to said disc.

4. In a movable device for finding positions, particularly a course protractor device for navigation purposes, substantially comprised of a protractor disc, a number of arms, two as a minimum, rotatably connected with the center of said disc, a visible center line directed toward the center of said disc and sight vanes registering with said center line on each of said arms, a base plate rotatably connected with said disc, and an edge of said base plate outside the area of said disc arranged to be held against an object in predetermined position: the novel arrangement of a curved recess in said base plate, said recess coaxial with the center of said disc, a member provided with a zero mark movably held in said recess, a graduation including a zero mark on said base plate close to said recess, and adjustable means for individually and temporarily immobilizing said base plate and each of said arms, respectively, relative to said disc.

5. In a movable device for finding positions, particularly a course protractor device for navigation purposes, substantially comprised of a protractor disc, a number of arms, two as a minimum, rotatably and removably connected with the center of said disc, a visible center line directed toward the center of said disc and sight vanes registering with said center line on each of said arms, a base plate rotatably and removably connected with said disc, a zero mark on said base plate, and an edge of said base plate outside the area of said disc arranged to be held against an object in predetermined position: the novel arrangement of adjustable means for individually and temporarily immobilizing said base plate and each of said arms, respectively, relative to said disc.

FRITZ VON OPEL.